Dec. 21, 1965   M. HOLTZ   3,224,881
CONTINUOUS PROCESS OF COOKING MEAT
Filed Oct. 18, 1963
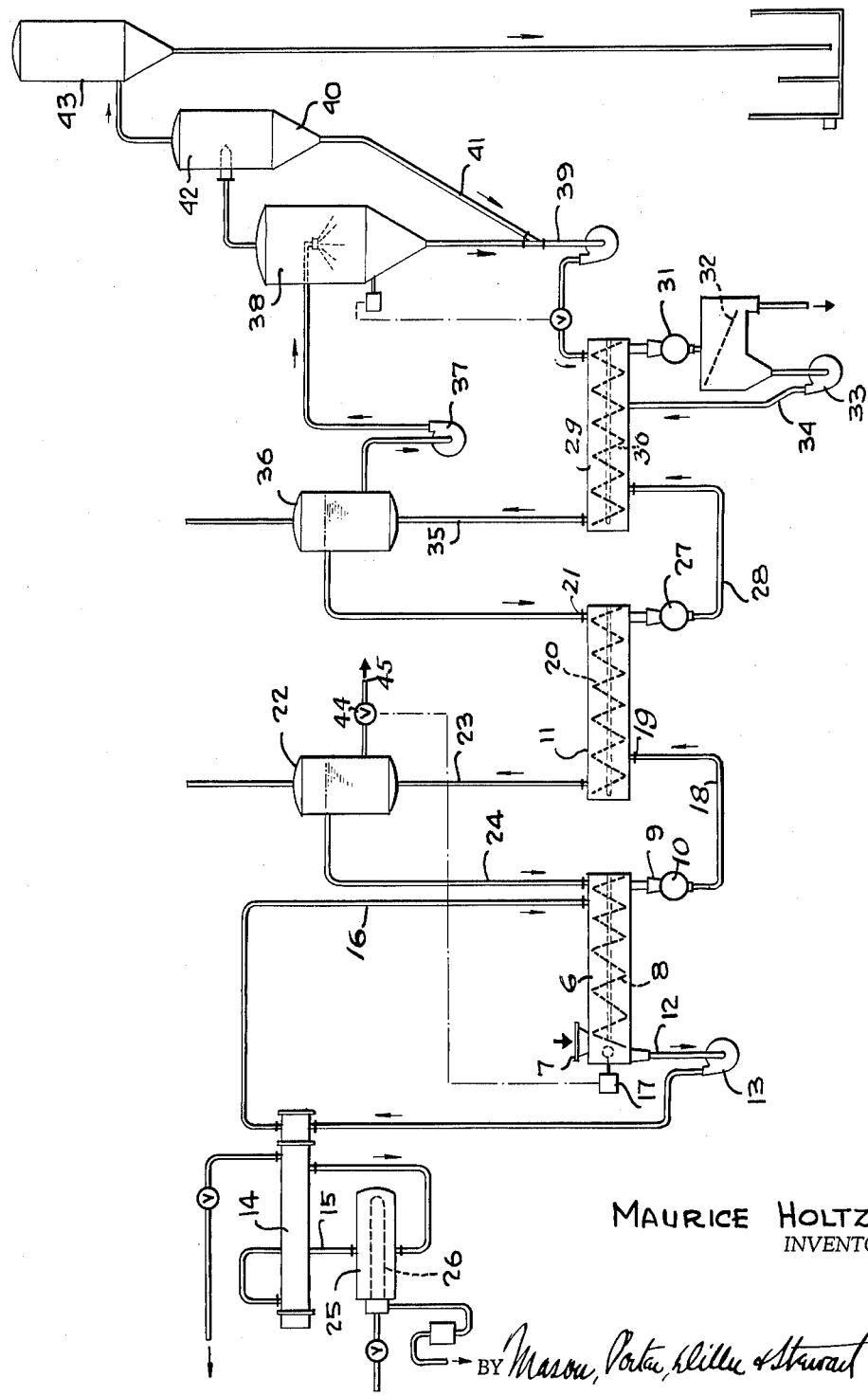
MAURICE HOLTZ
INVENTOR
BY *Mason, Porter, Diller & Stewart*
ATTORNEYS

United States Patent Office 3,224,881
Patented Dec. 21, 1965

3,224,881
CONTINUOUS PROCESS OF COOKING MEAT
Maurice Holtz, Huntingdon Valley, Pa., assignor to Acme Process Equipment Company, Oreland, Pa., a corporation of Pennsylvania
Filed Oct. 18, 1963, Ser. No. 317,176
5 Claims. (Cl. 99—107)

The following specification relates to a continuous process of cooking meat with maximum efficiency.

In cooking meat including beef, lungs, kidneys, liver and the like, on an industrial scale, there is a problem arising from the fact that some substances such as proteins and the like coagulate at the temperatures reached in cooking. These coagulated portions adhere to and bake onto the heating surfaces which are in contact with the material. This reduces the rate of heat transfer. It also fouls the equipment so that frequent and difficult cleaning is required. The usual maintenance of the heating surface is by continuous or periodical scraping.

Raising the heating of the material to adequate cooking temperatures cannot be accomplished by introducing live steam alone into the process material because the quantity of steam condensed adds excessive water diluting the material beyond the degree that can be tolerated.

The inevitable coagulation occurs mainly in the final stage of heating where the temperature of the meat and the heating surfaces exceed 200° F. The meats must attain a temperature of 200° F. to be adequately cooked in most cases.

In the present invention, the transfer of heat through the walls of the container is avoided in the stage above 160° F., and the transfer of heat in the stage before reaching 160° F. is accomplished indirectly through surfaces which contact only the juices and this is done in surfaces which remain substantially clean with a minimum of accumulation of deposits.

The first heating stage is performed by a countercurrent of heated juices which have been passed through a steam jacketed heater and returned thereto and thus circulated. The juices pass through narrow tubes in the heater at high velocity exceeding 11 ft. per second. At this velocity the surfaces of the tubes are substantially self-cleansing and deposits of coagulated solids which tend to form are removed by erosion almost as fast as they are formed.

To further minimize the formation of deposits, the surfaces of the tubes are heated by steam at sub-atmospheric pressure. The tube walls are then uniformily at the temperature of condensing steam at the low pressure and not hotter at the inlet nor colder at the outlet than they would be were the heating done by passing a hot liquid outside of the tubes. Furthermore, the rate of heat transfer through the tube walls is much higher when heat is derived from condensing steam than hot liquids. Consequently, the size of the heater necessarily is smaller. As a consequence of the smaller size of the necessary heater, the rate of circulation of juices necessary for attaining the high velocity is also smaller.

The steam is supplied to the juice heater at subatmospheric pressure by a boiler having a regulated steam coil. The boiler and the heater are connected as a closed system so that condensate returns from the heater to a vacuum pump or other kind of evacuating machinery and the sub-atmospheric pressure is controlled by a regulating valve. In this closed steam system, the quantity of air and other uncondensible gases is kept to a minimum and the heating is consequently more efficient since the presence of air substantially reduces the transfer of heat through steam heated surfaces.

The final stage of heating and the resultant cooking of the meat is carried out by introduction of live steam to heat the meat to approximately 200° F. Heating surfaces are avoided in this stage.

This is followed by cooling the meats by a countercurrent of cooled juices. The juices for this purpose are cooled by evaporation at sub-atmospheric pressures. Incidental to the last operation, water vapor is removed in an amount equal substantially to the amount of live steam injected into the cooker.

Among the objects of this invention is to maintain equivalency between the amount of steam added and the loss of evaporated water.

As illustrating the novel process of continuously cooking, a representative arrangement of equipment is illustrated on the accompanying flow diagram.

Briefly stated, the invention consists in passing the meat, possibly frozen, in the form of morsels diced or in the form of chunks, first through a preheating stage in which the heating is effected by transfer from previously heated meat juices. The final cooking of the meat and juices is then carried out by the direct injection of live steam, avoiding the transfer of heat through the vessel walls both in the cooking and in the preheating stages.

The subsequent cooked mixture is then cooled by contact with a countercurrent of juices which have been suitably cooled by evaporation at a pressure which is lower than atmospheric pressure. These juices are drawn by decantation or the like from the vessel in which they contact the meats and are circulated by passing through the vessel in which they are sprayed or otherwise suitably exposed for efficient evaporation and then returned to that vessel in which they contact the meats.

On the flow diagram there is illustrated a preheating tank 6 in the form of a horizontal cylinder with screw conveyer, having an inlet 7 at one end through which the frozen meat is delivered in relatively small particles. The meat is advanced by a screw conveyer 8 through the tank 6 to an outlet 9 at the bottom. It is there passed through a discharge pump 10 to a cooker 11.

A stream of meat juices from the inlet end of the preheater is drawn through conduit 12 to a pump 13. The pump delivers to a steam jacketed heater 14. The juices pass through narrow tubes at high velocity so that solids which form and tend to adhere to the tube surfaces are dislodged and swept out by the swift current of liquid before they can encrust those surfaces.

The liquid heater is maintained at an elevated temperature by a supply of steam 15. This steam is produced at low pressure, preferably sub-atmospheric pressure by a boiler 25 having a steam coil 26. The steam side of the heater is vented to a vacuum pump through a regulating valve and the pressure of the steam is regulated to the pressure which corresponds with the lowest condensing temperature of steam which will adequately heat the juice in the heater. This temperature is approximately 180° F. and the corresponding absolute pressure is approximately 7.5 pounds per square inch.

The condensate from the steam condensing in the heater returns to the boiler and is evaporated again continuously.

The heated juices are returned by conduit 16 to the discharge end of the preheater 6. There it forms a countercurrent for the meat. It raises the temperature of the latter to 160° F.

The conveyer tank 6 is maintained approximately-half full of meat, so regulated by the rate of feed. The level of the liquid is somewhat lower and maintained at this level by an overflow weir or the like at the inlet end of tank 6.

The meat and a portion of the juice is then transferred through conduit 18 into the cooker 11. The cooker 11 is a closed horizontal tank or other vessel having an inlet 19 from the conduit 18.

The cooker 11 has a similar agitating screw conveyer 20.

Live steam is injected at 21 into the tank of the cooker 11. This steam condenses with the meat and juices, raising the temperature of the latter to at least 200° F. where the material is adequately cooked.

Juice at about 160° F. is drawn from the inlet end of cooker 20 and rises to the surge tank 22 through pipe 23. From this the juice flows through pipe 24 to the delivery end of preheater 6.

The mixture from the cooker is discharged through pump 27. Pump 27 discharges by means of pipe 28 into a cooler 29.

The cooler 29 is in the form of a horizontal closed tank also equipped with agitating means 30.

The mixture passes through the cooler 29 and is discharged through valve 31 in the form of completely cooked product at a temperature of 160° F. At this point it is drained over a screen 32 and the liquid returned to the cooler, through pump 33 and pipe 34.

The juice is drawn off from the inlet end of cooler 29 through pipe 35 to a surge tank 36 and thence by pump 37 through a spray by which evaporation proceeds.

The liquid is circulated through and sprayed in the spray chamber 38 in quantity sufficient so that the quantity of heat thus removed from this liquid is equal to the quantity of heat removed from the meat when cooling the meat from 200° F. to 160° F.

By reason of the spray operation and evaporation the liquor has a temperature of approximately 155° F. It is delivered to the outlet end of the cooler 29 and forms a countercurrent to the mixture reducing its temperature to approximately 160° F.

Water vapor from the spray chamber 38 is delivered to a liquid trap 40.

Liquid which had been entrained in the water vapor drops out in trap 40 and drains back through pipe 41 and is thus restored to the stream of cooled liquid in pipe 39.

Steam and vapor from the trap 40 is delivered by a pipe extending from an entrainment separator 42 to a barometric condenser 43 in which it is condensed by a stream of water.

The above description of a typical installation for the practice of the novel process illustrates the features of the invention. As set out above, cold or frozen meat in small pieces, morsels or chunks is preheated by a countercurrent of heated meat juices. In this step the meat is raised to a desired preheated temperature such as 160° F.

It is then subjected to a cooking operation in which it is treated with a minimum of injected live steam. This step avoids the transfer of heat from the steam through the walls of the cooking vessel, and thus the cooking is carried out most efficiently. The characteristic of this step is that coagulation of the material ocurs without deposit upon the wall of the cooking vessel.

The completely cooked meat, now at 200° F. or over, together with the juices and condensed steam is then passed through a cooler. There the solids are cooled to about 160° F. by a stream of the withdrawn and cooled juices. These in cooled condition travel countercurrent to the solids.

The cooked product is then withdrawn from the cooler. Throughout the operation the live steam condenses and passes by a pump to the vacuum spray chamber. It is there evaporated and any entrained juices are returned to the cooler. The operations are essentially carried out at low pressures.

Incidental to the transfer of meats from tank 6 to tank 11 and from tank 11 to tank 29 and thence to the screen 32, there is also a transfer of juices together with the meat in greater quantity than is produced naturally from the meat by the cooking process. Some juice eventually passes out with the drained meat from screen 32 as surface moisture.

This is usually of lesser amount than is produced by cooking. The rest of the juice and also the excess present as caused by the excessive transfers is returned from screen 32 to the cooler tank 29 and from tank 29 to cooker tank 11 and from tank 11 to tank 6 via surge tanks 36 and 22 by means of pump 33 and overflows from surge tanks 36 and 22 respectively. The juice stands at approximately the same level in the surge tanks 36 and 22. This return of juices causes an accumulation of juice in tank 6 to overflow into a receptacle 17 at the inlet end of tank 6. A level regulator in this receptacle actuates a regulating valve 44 so that a stream of juice is passed out of surge tank 22 through outlet 45. The juice which passes out through pipe 45 is the net quantity of juice produced less the quantity associated with the wet drained meat issuing from the screen 32.

The temperature at which the preheating stage stops and the live steam cooking stage proceeds may be more or less than 160° F. according to the desired final temperature of the cooked products. Because of the approximate equivalency of the quantity of heat removed by evaporating water and the quantity of heat added by condensing the same amount of live steam, the temperature at which the live steam cooking stage starts is approximately the same as the final temperature of the cooked products after the cooling stage. Accordingly, if the final temperature desired is low enough, the preheating stage may be substantially reduced or eliminated altogether, and the entire process would in the latter case be conducted by live steam and the subsequent evaporative cooling stage.

The process may be carried out by other equipment than the above example. In like manner, slight changes in temperatures, procedures and other conditions may be effected within the scope of the invention as defined in the following claims.

What I claim is:

1. A process of continuously cooking diced meat which comprises preheating said meat by passing a continuous stream of the meat against a countercurrent of hot meat juices to a temperature not exceeding about 160° F., then cooking said meat and juices with live steam in a cooking zone until the meat is adequately cooked, and subsequently passing said cooked meat and juices to a cooling zone whereat a portion of the juices is removed and cooled by evaporation; said cooled juices passing countercurrent to the flow of the cooked meat in said cooling zone to cool the cooked meat to a temperature not exceeding about 160° F.

2. The process of claim 1 further characterized in that while the portion of the juices is being cooled by evaporation and passed countercurrent to the flow of the cooked meat in the cooling zone, the remaining portion of juices is passed countercurrent to the flow of the meat in the cooking zone.

3. The process of claim 1 further characterized in that the cooked meat passing from the cooling zone is separated from the juices which are recycled to the cooling zone.

4. The process of claim 1 further characterized in that the meat and juices are cooked with live steam at subatmospheric pressures.

5. The process of claim 1 further characterized in that the meat juices are cooled by evaporation at sub-atmospheric pressures.

References Cited by the Examiner

UNITED STATES PATENTS

| | | |
|---|---|---|
| 1,234,131 | 7/1917 | Cleveland. |
| 2,546,163 | 3/1951 | McBeth. |
| 2,793,582 | 5/1957 | Rothe et al. _____ 99—443 |
| 2,908,577 | 10/1959 | Hawk et al. _____ 99—1 X |
| 3,071,473 | 1/1963 | Churley _____ 99—1 |

A. LOUIS MONACELL, *Primary Examiner.*

HYMAN LORD, *Examiner.*